United States Patent
Kessler

(10) Patent No.: US 6,954,710 B2
(45) Date of Patent: Oct. 11, 2005

(54) METHOD AND MONITORING SYSTEM FOR MONITORING AT LEAST ONE SUBSCRIBER LINE

(75) Inventor: Steffen Kessler, Burbach (DE)

(73) Assignee: Deutsche Telekom, Bonn (DE)

( * ) Notice: Subject to any disclaimer, the term of this patent is extended or adjusted under 35 U.S.C. 154(b) by 34 days.

(21) Appl. No.: 10/239,485

(22) PCT Filed: Jan. 24, 2001

(86) PCT No.: PCT/EP01/00767
§ 371 (c)(1),
(2), (4) Date: Sep. 20, 2002

(87) PCT Pub. No.: WO01/72021
PCT Pub. Date: Sep. 27, 2001

(65) Prior Publication Data
US 2003/0040890 A1 Feb. 27, 2003

(30) Foreign Application Priority Data
Mar. 23, 2000 (DE) .......................................... 100 14 462

(51) Int. Cl.[7] .............................. G06F 11/20; H04J 1/16
(52) U.S. Cl. ........................... 702/88; 702/182; 370/248
(58) Field of Search ............................ 702/81, 82, 182, 702/185, 189; 370/252, 376, 377

(56) References Cited

U.S. PATENT DOCUMENTS

| | | | | |
|---|---|---|---|---|
| 4,730,313 A | * | 3/1988 | Stephenson et al. | 370/249 |
| 4,989,202 A | * | 1/1991 | Soto et al. | 370/244 |
| 4,998,240 A | * | 3/1991 | Williams | 370/251 |
| 5,027,343 A | * | 6/1991 | Chan et al. | 370/250 |
| 6,115,362 A | * | 9/2000 | Bosa et al. | 370/248 |

FOREIGN PATENT DOCUMENTS

| | | |
|---|---|---|
| DE | 19729072 | 12/1998 |
| EP | 0474189 | 3/1992 |
| WO | 910463 | 4/1991 |

* cited by examiner

Primary Examiner—Kamini Shah
(74) Attorney, Agent, or Firm—Davidson, Davidson & Kappel, LLC

(57) ABSTRACT

A method for signaling to a central facility a fault of at least one subscriber line connected to a switching center via a respective connection line having a $U_{K0}$ interface includes permanently activating the at least one subscriber line using the switching center. Each of the at least one subscriber line is monitored using a respective monitoring device looped into a $U_{K0}$ interface on the respective connection line. A connection to the central facility is established via a separate subscriber line in response to a fault of a first of the at least one subscriber line detected by the respective monitoring device. An item of information related to the first subscriber line is transmitted to the central facility.

13 Claims, 1 Drawing Sheet

METHOD AND MONITORING SYSTEM FOR MONITORING AT LEAST ONE SUBSCRIBER LINE

BACKGROUND

The present invention relates to a method for signaling a fault of at least one subscriber line to be monitored to a central facility as well as to a monitoring system for monitoring such a subscriber line.

The acceptance of public telecommunications networks among the customers essentially depends on their reliability of operation and performance. Therefore, a major task of the network operators is to monitor established connections or connections to be established within these telecommunications networks and, if necessary, to perform a fault diagnosis.

One possibility of monitoring ISDN telecommunications networks is to measure and log ISDN basic accesses at the $S_0$ interface at the telephone subscriber end (see, for example, the operating instructions of the ISDN $S_0$ basic access measuring and testing device Pegasus from the Festo Didactic KG company, Esslingen, as of 02/95; page 85).

German Patent DE 197 29072 describes a method for measuring or logging an ISDN basic access which can also be executed independently of the telephone subscriber to be monitored. This is achieved by opening the $U_{K0}$ interface at a point of the connection line that is convenient for measurement or logging. In the opened $U_{K0}$ interface, the line signals are converted into IOM signals, and the IOM signals are in turn converted into $S_0$ frames. Consequently, all data of the tapped $S_0$ interface are available to already existing $S_0$ measuring devices at the point where the connection line is opened.

SUMMARY OF THE INVENTION

An object of the present invention is to provide a method and a monitoring system with which at least one subscriber line can be continuously monitored and with which a central security facility can be immediately alerted in case of a fault. with which a central security facility can be immediately alerted in case of a fault.

The present invention provides a method for signaling to a central facility a fault of at least one subscriber line, each of the at least one subscriber line being connected to a switching center via a respective connection line, each connection line including a $U_{K0}$ interface. The method includes: permanently activating the at least one subscriber line using the switching center; monitoring each of the at least one subscriber line using a respective monitoring device looped into a $U_{K0}$ interface of the respective connection line; establishing a connection to the central facility via a separate subscriber line in response to a fault of a first of the at least one subscriber line detected by the respective monitoring device; and transmitting an item of information related to the first subscriber line to the central facility.

In order to be able to monitor the subscriber line, the switching center keeps the subscriber line permanently active, i.e., in the rest state, predetermined test messages (keep alive, polling) are continuously transmitted from the switching center to the subscriber line and vice versa, for example, every ten seconds, so that an interruption of the connection line can always be detected in this manner. The permanent activation can also refer to layer 1, i.e., the synchronization of the $U_{K0}$ interface can be used for monitoring. A monitoring device, which is looped into the $U_{K0}$ interface of the corresponding connection line, monitors the at least one subscriber line. This is done, for example, by checking the test messages, which are transmitted during the activation, for their presence on the connection line. If the monitoring device detects a fault of the at least one subscriber line to be monitored, for example, an interruption of the connection line, a connection to the central facility is established via a separate subscriber line, in particular, of a public telecommunications network. Subsequently, a fault message and/or an item of information related to the subscriber line, such as the address or call number of the disturbed subscriber line, is/are transmitted to the central facility.

In this manner, it is possible to continuously monitor a subscriber line and to transmit a fault message and the address of the disturbed subscriber line to a central security facility in case of a fault.

The monitoring device is expediently looped into the $U_{K0}$ interface of the respective connection line near the switching center, i.e., in the same building.

If the intention is to use the method to monitor a plurality of subscriber lines assigned to the switching center and to measure and/or log their states in case of a fault, initially, a first connection set-up is initiated at this or another external terminal device via the separate subscriber line preferably to a DTMF (multifrequency dialing) controllable switching matrix, subsequent to the transmission of the fault message and/or of the item of information related to the subscriber line to the central facility. Thereupon, the switching matrix is programmed as a function of the item of information related to the subscriber line in such a manner that a measuring device, which is connected to the separate subscriber line, can be connected to the disturbed subscriber line via a $U_{K0}$ tap of the respective subscriber line that is contained in the monitoring device. Subsequently, the connection is released again. After that, a second connection set-up is initiated at the central facility or at the other external terminal device via the separate subscriber line to the measuring device, which is now caused to measure and/or log the state of the disturbed subscriber line and to transmit the results via the existing connection to the central facility or to the external terminal device.

Preferably, the subscriber lines to be monitored and the separate subscriber line are ISDN basic accesses. In this case, the measuring device is designed to create a D channel protocol of the $S_0$ interface of the ISDN basic access. To this end, however, it is required to connect each connection line to the switching matrix via the $U_{K0}$ tap. The $U_{K0}$ tap of each monitoring device provides that the data tapped at the $U_{K0}$ interface of the connection line is converted into an $S_0$ frame which can be processed by the measuring device. Such a $U_{K0}$ tap is known from German Patent DE 197 29072.

The present invention provides a monitoring system for monitoring at least one subscriber line which is connected to a switching center via a connection line which features a $U_{K0}$ interface. Looped into the $U_{K0}$ interface of each connection line to be monitored that is connected to the switching center is moreover a device for monitoring the associated subscriber line. Each monitoring device is connectable to a device for generating a fault message and/or an item of information related to the subscriber line, the latter device, in turn, being connected to a separate subscriber line. Via this separate subscriber line, it is possible for the device for generating a fault message and/or an item of information related to the subscriber line to establish a connection to a central facility to transmit the fault message and/or the item of information related to the subscriber line. The device for generating a fault message and/or an item of information related to the subscriber line can be, for example, a DS 7500 device from the effeff company.

Except for the central facility, all devices and units can be accommodated in the building of the switching center.

Advantageously, each monitoring device has a detector as well as a controllable switch which, when the detector detects a fault of the associated subscriber line, connects the respective monitoring device to the device for generating a fault message and/or an item of information related to the subscriber line. In this manner, the device for generating a fault message and/or an item of information related to the subscriber line is caused to generate the fault message and/or the item of information related to the subscriber line about the disturbed subscriber line and to transmit it to the central facility.

In order to be able to measure and/or log at least one subscriber line, at least one monitoring device is connectable to a measuring device which is connected to the separate subscriber line. Thus, it is possible for the measuring device to measure and/or log the state of the disturbed subscriber connection, which is tapped via the monitoring device, and to transmit the results via a public network to the central facility or to another external device.

To permit monitoring of a plurality of subscriber lines, a switching matrix is connected between the monitoring devices and the measuring device. Moreover, a DTMF remote control device is connected to the separate subscriber line and to the switching matrix, the DTMF remote control device being able to be dialed up by the central facility or another external device via the separate subscriber line for controlling the switching matrix.

If the item of information related to the subscriber line includes the address of a disturbed subscriber line, then the switching matrix can be programmed via the DTMF control device as a function of the address in such a manner that the measuring device can be connected to the corresponding $U_{K0}$ tap.

If the subscriber lines are ISDN basic accesses, each monitoring device features a $U_{K0}$ tap, the $S_0$ interface of the monitoring device being connected to the switching matrix. In this manner, the tapped $S_0$ interface of the disturbed ISDN basic access can be tapped via the switching matrix and connected to the measuring device. The measuring device is capable of analyzing the D, $B_1$ or $B_2$ channels of an ISDN connection.

Furthermore, it should be mentioned that, besides the ISDN connections mentioned here, it is also possible to monitor standard fixed lines and direct data connections which are provided with a $U_{K0}$ interface.

DESCRIPTION OF THE DRAWING

In the following, the present invention will be explained in greater detail based on an exemplary embodiment with reference to the drawing, in which.

DETAILED DESCRIPTION

Figure 1:
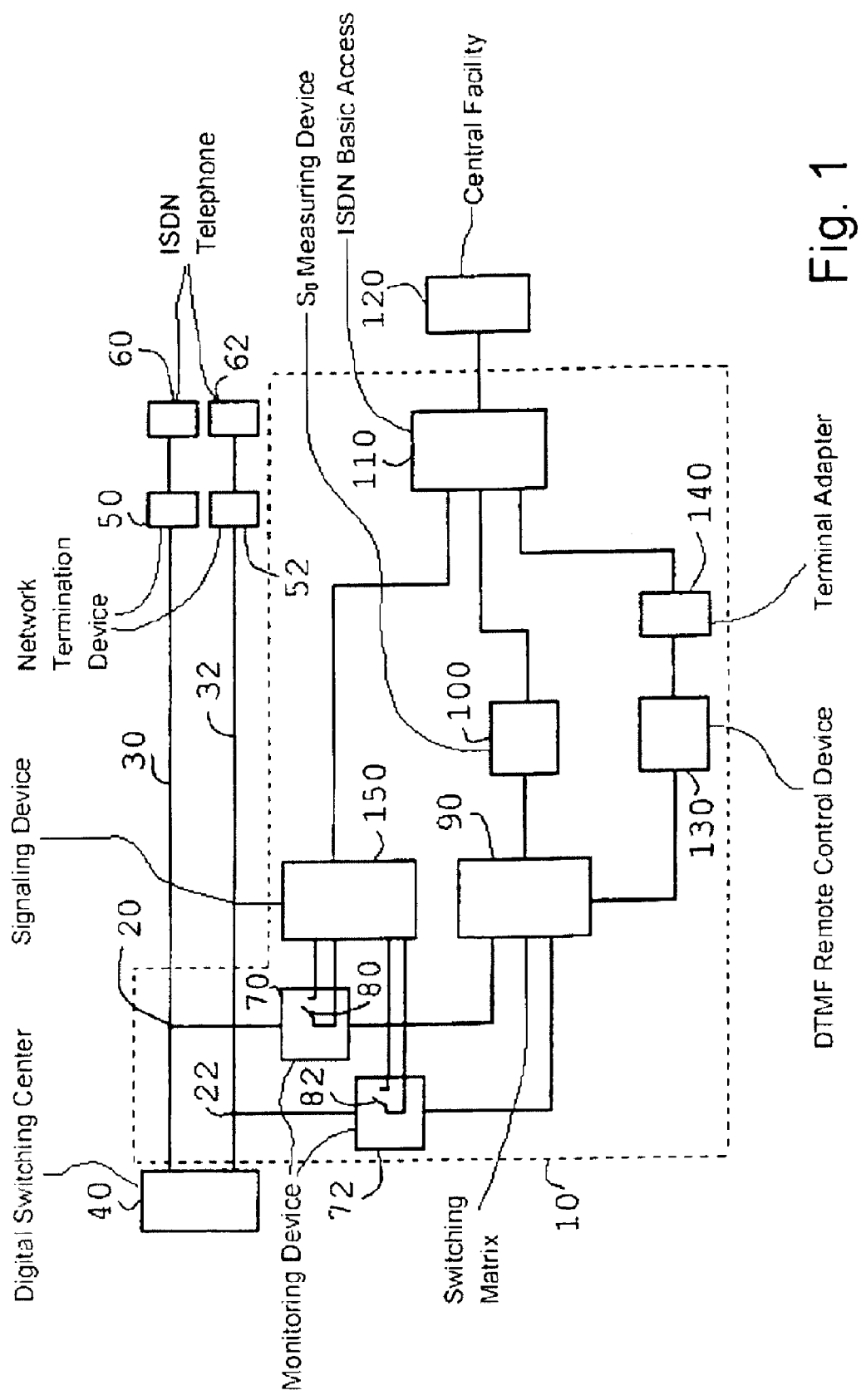
FIG. 1 shows a schematic representation of a monitoring system for monitoring at least one subscriber line.

FIG. 1 shows a monitoring system which is universally denoted by 10 and is connected near a digital switching center 40 via a monitoring device 70 at an opened $U_{K0}$ interface 20 of a connection line 30 and via a monitoring device 72 at an opened $U_{K0}$ interface 22 of a connection line 32. Although only two connection lines are connected to digital switching center 40, it is obvious that a plurality of connection lines can be connected to digital switching center 40 and to monitoring system 10.

At the subscriber end, connection lines 30 and 32 are terminated at the ISDN basic access with a network termination device 50 and 52, respectively. Each network termination device 50, 52 is connected to an ISDN telephone 60 or 62, respectively.

At this point, it should be mentioned that monitoring system 10 can be suitable not only for monitoring connection lines featuring ISDN basic accesses but also for monitoring standard fixed lines and direct data connections.

Monitoring devices 70 and 72 each contain detectors (not shown) with which, for example, an interruption on respective connection line 30 or 32 can be detected as a fault. Moreover, each monitoring device 70, 72 features a potential-free contact 80 and 82, respectively, via which a fault of the associated subscriber line that is detected by the corresponding monitoring device 70, 72 can be signaled to a signaling device 150 for generating a fault message and/or an item of information related to the subscriber line, referred to as signaling device 150 hereinafter. Moreover, each monitoring device 70, 72 has a $U_{K0}$ tap (not shown), which is known per se and via which the monitoring devices can be connected to a switching matrix 90. The mode of operation of the $U_{K0}$ tap is known from German Patent DE 197 29072, which is included herein by reference. The $U_{K0}$ taps provide that the signals to be tapped at $U_{K0}$ interfaces 20 and 22 are converted into $S_0$ frames which, in turn, can be processed in a conventional $S_0$ measuring device 100, which is connected to switching matrix 90. As will still be explained in greater detail below, the state of each ISDN basic access, in particular, the D channel of an ISDN connection, can be measured and logged using $S_0$ measuring device 100. Moreover, measuring device 100 is connected to an ISDN basic access 110 via which a connection can be established via a public network to a central facility 120 or to an arbitrary terminal device equipped with an ISDN card. In this manner, as will still be explained in greater detail below, it is possible to transmit the measuring results and logs of measuring device 100 to central facility 120.

Also connected to ISDN basic access 110 is, for example, a DTMF remote control device 130, possibly via a conventional terminal adapter 140.

On the output side, DTMF remote control device 130 is connected to switching matrix 90. The control of switching matrix 90 through DTMF remote control device 130 can take place, for example, via central facility 120. For that purpose, the central facility must be able to generate signals according to the multifrequency dialing method. A method, which is suitable for this, is disclosed in German Patent 199 34 622, which is is hereby incorporated by reference herein.

In the following, the mode of operation of monitoring system 10 will be explained in greater detail. First of all, the two ISDN basic accesses of connection lines 30 and 32 are assumed to be continuously monitored with the aid of a permanent activation. Due to the triggered permanent activation, predetermined test messages are transmitted back and forth between digital switching center 40 and ISDN telephones 60 and 62 approximately every ten seconds, also in the rest state. As long as the detectors of monitoring devices 70 and 72 detect the presence of these test messages, monitoring system 10 is in the so-called "monitoring mode". However, as soon as no test messages are detected any more on one of connection lines 30 or 32, i.e., an interruption of the connection line is detected, monitoring system 10 goes into the signaling and measuring mode with respect to this connection line. In this context, it is assumed, for example, that connection line 30 has been interrupted. In response to the interruption of connection line 30, the detector of monitoring device 70 closes potential-free contact 80, as a result of which a fault of the ISDN basic access of connection line 30 is signaled to signaling device 150. Signaling device 150 recognizes the disturbed ISDN basic access and the call number thereof from the actuation of potential-free contact 80. Thereupon, signaling device 150 establishes a connection, via ISDN basic access 110, to central facility 120 and transmits a corresponding fault message as well as the call number of the disturbed ISDN basic access to central facility 120. The connection between signaling device 150 and central facility 120 can be released after the transmission of the fault message and the call number. Now, a monitoring person at central facility 120 initiates a connection set-up via ISDN basic access 110 to DTMF remote control device 130 and enters the call number of the disturbed ISDN basic access at central facility 120, the call number being transmitted to DTMF remote control device 130 by multifrequency tones. In response to the received call number of the disturbed ISDN basic access, DTMF remote control device 130 controls switching matrix 90 in such a manner that measuring device 100 is able to measure and/or log the corresponding subscriber line via the $U_{K0}$ tap. Subsequently, the monitoring person releases the connection to DTMF remote control device 130 again, and initiates a second connection set-up via ISDN basic access 110 to measuring device 100. Measuring device 100 is now connected to the $U_{K0}$ tap of the corresponding monitoring device (70, 72) and is consequently able to analyze and log the D, $B_1$ or $B_2$ channels of the disturbed ISDN basic access. The current states, results and logs of the disturbed ISDN basic access can be transmitted by measuring device 100 via ISDN basic access 110 to central facility 120 and there be displayed by the monitoring person on a display. In this manner, the monitoring person can immediately decide whether it is required to send a service technician to the customer of the disturbed ISDN basic access or whether remote maintenance is possible. After the fault has been eliminated, monitoring system 10 is reset to the monitoring mode with respect to connection line 30, that is, potential-free contact 80 of monitoring device 70 is opened again.

Although in the present example, only a measuring device 100 is connected to switching matrix 90 and only one ISDN basic access 110 is used, it is conceivable to connect a plurality of measuring devices 100 to switching matrix 90 and to connect the measuring devices to central facility 120 via a plurality of ISDN basic accesses.

Thanks to the described monitoring system 10, it is possible to continuously monitor one or a plurality of subscriber line(s) and to transmit a fault message and the address of the disturbed subscriber line to a central facility in case of a fault. Moreover, it is possible to directly influence the monitoring system in many ways from the central facility via the public network. For instance, it is conceivable for call forwarding to be activated in switching center 40 for a disturbed ISDN basic access.

What is claimed is:

1. A method for signaling to a central facility a fault of at least one subscriber line, each of the at least one subscriber line being connected to a switching center via a respective connection line, each connection line including a $U_{K0}$ interface, the method comprising:

permanently activating the at least one subscriber line using the switching center;

monitoring each of the at least one subscriber line using a respective monitoring device looped into a $U_{K0}$ interface of the respective connection line;

establishing a connection to the central facility via a separate subscriber line in response to a fault of a first of the at least one subscriber line detected by the respective monitoring device; and transmitting an item of information related to the first subscriber line to the central facility.

2. The method as recited in claim 1 wherein the item of information is a fault message.

3. The method as recited in claim 1 wherein each monitoring device is looped into the $U_{K0}$ interface of the respective connection line near the switching center.

4. The method as recited in claim 1 further comprising:

initiating, at at least one of the central facility and an external terminal device, subsequent to the transmission of the item of information to the central facility, a first connection to a controllable switching matrix via the separate subscriber line;

programming the switching matrix as a function of the item of information so that a measuring device connected to the separate subscriber line is capable of being connected to the monitoring device of the respective connection line;

releasing the first connection; and initiating, at at least one of the central facility and the external terminal device, a second connection via the separate subscriber line to the measuring device, the second connection being capable of at least one of measuring and logging a state of a disturbed subscriber line and transmitting the state to at least one of the central facility and the external device.

5. The method as recited in claim 1 wherein the at least one subscriber line and the separate subscriber line each include an ISDN basic access.

6. The method as recited in claim 5 further comprising:

initiating, at at least one of the central facility and an external terminal device, subsequent to the transmission of the item of information to the central facility, a first connection to a controllable switching matrix via the separate subscriber line;

programming the switching matrix as a function of the item of information so that a measuring device connected to the separate subscriber line is capable of being connected to the monitoring device of the respective connection line;

releasing the first connection; and initiating, at at least one of the central facility and the external terminal device, a second connection via the separate subscriber line to the measuring device, the second connection being capable of at least one of measuring and logging a state of a disturbed subscriber line and transmitting the state to at least one of the central facility and the external device;

and wherein the measuring device is capable of creating a D, $B_1$ or $B_2$ channel protocol, and each respective connection line is connected to the switching matrix via a $U_{K0}$ tap included in the respective monitoring device.

7. A monitoring system for monitoring at least one subscriber line, each of the at least one subscriber line being connected to a switching center via a respective connection line, each connection line including a $U_{K0}$ interface, the monitoring system comprising:

a monitoring device connected to a first subscriber line and configured to monitor the first subscriber line, the monitoring device being looped into the respective $U_{K0}$ interface of the respective connection line;

a signaling device configured to generate an item of information related to the first subscriber line, the signaling device being connectable to the monitoring device, the signaling device being connected to a separate subscriber line, the signaling device being capable of establishing a connection to a central facility via the separate subscriber line so as to transmit the item of information to the central facility.

8. The monitoring system as recited in claim 7 wherein the item of information is a fault message.

9. The monitoring system as recited in claim 7 wherein the monitoring device includes a detector and a controllable switch, the controllable switch configured to signal a fault of the first subscriber line to the signaling device when the detector detects the fault.

10. The monitoring system as recited in claim 7 further comprising a measuring device connected to the separate subscriber line, the measuring device being capable of at least one of measuring and logging a state of the first subscriber line and transmitting the state to at least one of the central facility and an external device, and wherein the monitoring device is connectable to the measuring device.

11. The monitoring system as recited in claim 10 further comprising:

a switching matrix connected between the monitoring device and the measuring device; and a remote control device connected to the separate subscriber line and to the switching matrix, the remote control device being capable of being dialed up by at least one of the central facility and the external device via the separate subscriber line so as to control the switching matrix.

12. The monitoring system as recited in claim 11 wherein the item of information includes the address of the first subscriber line, and wherein the switching matrix is capable of being programmed as a function of the address using the remote control device so as to enable the measuring device to be connected to the monitoring device.

13. The monitoring system as recited in claim 7 further comprising a measuring device connected to the separate subscriber line, the measuring device being capable of at least one of measuring and logging a state of a the first subscriber line and transmitting the state to at least one of the central facility and an external device, and wherein:

the monitoring device is connectable to the measuring device;

the first subscriber lines includes an ISDN basic access;

the monitoring device includes a $U_{K0}$ tap, an $S_0$ interface being connected to the switching matrix; and the measuring device is capable of analyzing an D, $B_1$ or $B_2$ channel of an ISDN connection.

* * * * *

UNITED STATES PATENT AND TRADEMARK OFFICE
CERTIFICATE OF CORRECTION

| | | |
|---|---|---|
| PATENT NO. | : 6,954,710 B2 | |
| APPLICATION NO. | : 10/239485 | |
| DATED | : October 11, 2005 | |
| INVENTOR(S) | : Steffen Kessler | |

It is certified that error appears in the above-identified patent and that said Letters Patent is hereby corrected as shown below:

Please list reference "Operating instructions of the ISDN S0 basic access measuring and testing device Pegasus from the Festo Didacti KG company, Esslingen, as of 02/95, page 85" submitted with IDS of May 27, 2004, acknowledged May 31, 2005.

Claim 7, column 6, line 63 to column 7, line 12 should read:

7.     A monitoring system for signaling a central facility of a fault of at least one subscriber line, the monitoring system comprising:

a switching center configured for permanently activating the at least one subscriber line and being connectable to each of the at least one subscriber line via a respective connection line including a $U_{K0}$ interface;

a monitoring device connected to a first subscriber line and configured to monitor the first subscriber line, the monitoring device being looped into the respective $U_{K0}$ interface of the respective connection line;

a signaling device configured to generate an item of information related to the first subscriber line, the signaling device being connectable to the monitoring device, the signaling device being connected to a separate subscriber line, the signaling device being capable of establishing a connection to the central facility via the separate subscriber line in response to a fault of the first subscriber line so as to transmit the item of information to the central facility.

UNITED STATES PATENT AND TRADEMARK OFFICE
CERTIFICATE OF CORRECTION

PATENT NO. : 6,954,710 B2
APPLICATION NO. : 10/239485
DATED : October 11, 2005
INVENTOR(S) : Steffen Kessler It is certified that error appears in the above-identified patent and that said Letters Patent is hereby corrected as shown below:

instead of

7. A monitoring system for monitoring at least one subscriber line, each of the at least one subscriber line connected to a switching center via a respective connection line, each connection line including a $U_{K0}$ interface, the monitoring system comprising:

a monitoring device connected to a first subscriber line and configured to monitor the first subscriber line, the monitoring device being looped into the respective $U_{K0}$ interface of the respective connection line;

a signaling device configured to generate an item of information related to the first subscriber line, the signaling device being connectable to the monitoring device, the signaling device being connected to a separate subscriber line, the signaling device being capable of establishing a connection to a central facility via the separate subscriber line so as to transmit the item of information to the central facility.

In column 8, line 18 should read "least on of the measuring and logging a state of the first" instead of "least one of measuring and logging a state of a the first".

In column 8, line 24 should read "the first subscriber line includes an ISDN basic access;" instead of "the first subscriber lines includes an ISDN basic access;".

Signed and Sealed this

Twenty-seventh Day of October, 2009

David J. Kappos
*Director of the United States Patent and Trademark Office*